(No Model.)
J. FITZGERALD.
SLIDE REST.
No. 331,046. Patented Nov. 24, 1885.
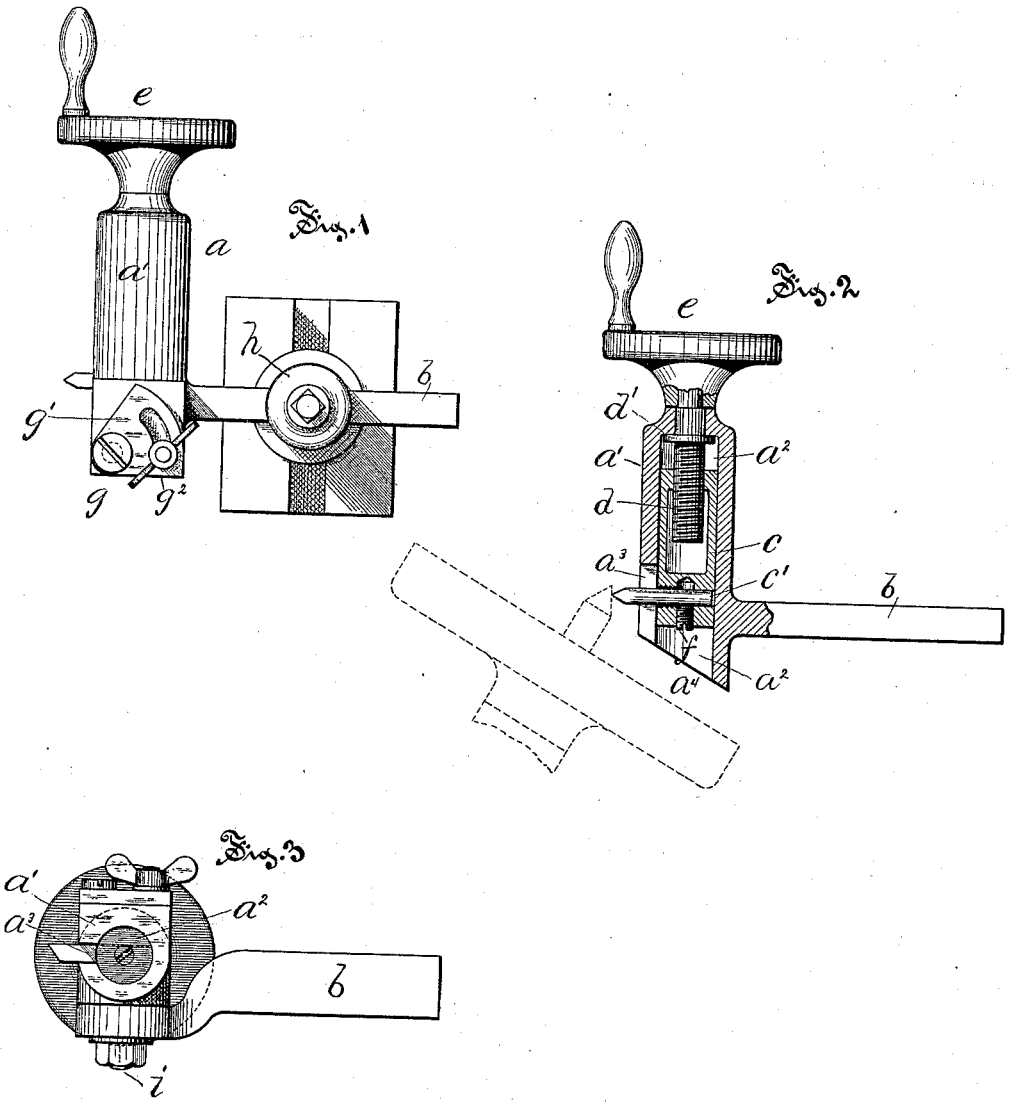

UNITED STATES PATENT OFFICE.

JAMES FITZGERALD, OF PROVIDENCE, RHODE ISLAND.

SLIDE-REST.

SPECIFICATION forming part of Letters Patent No. 331,046, dated November 24, 1885.

Application filed October 9, 1884. Serial No. 145,067. (No model.)

*To all whom it may concern:*

Be it known that I, JAMES FITZGERALD, of Providence, in the county of Providence and State of Rhode Island, have invented certain new and useful Improvements in Slide-Rests; and I do hereby declare that the following is a full, clear, and exact description of the same, reference being had to the accompanying drawings, where—

Figure 1 is a top view of my improved holder as held in the tool-post of a lathe. Fig. 2 is a view of the same, with parts broken away in horizontal section to show construction. Fig. 3 is an end view, in elevation, of a holder, showing the shank and socket-piece pivoted together.

My invention relates to the class of devices used on lathes and like machines for holding and moving various cutting or boring tools; and it consists in the improved holder or rest having a shank by means of which the device may be held in a tool-post; in the means for holding and sliding the tool in the holder, and also in the combination of devices for determining the angle at which the tool shall cut.

In the accompanying drawings, the letter $a$ denotes the slide rest or holder as a whole; $b$, the shank integral with or firmly fastened to the body $a'$ of the holder, and, as shown in Fig. 2, projecting at right angles from the holder. The body or case $a'$ has a central lengthwise socket, $a^2$, open at one end, and in this socket a sliding rest or carrier, $c$, is movable by means of the feed-spindle $d$, which, for a part of its length, is threaded and fits into a threaded socket in the inner end of the carrier. The spindle turns freely in a bearing in the end of the body $a'$, and its projecting end bears a hand-wheel, $e$, or equivalent device, by means of which the spindle may be rotated. The spindle is held against longitudinal play by the shoulder or collar $d'$, that rests against one side of the end wall of the body, and the hub of the wheel $e$ on the opposite side of it, or by any other well-known means. The carrier $c$ has a transverse tool-socket, $c'$, near its outer end, and in this a tool may be clamped by means of the screw $f$, that is held in a threaded socket in the center of the end of the carrier. This screw-socket, however, is long enough to hold a tool that may be inserted into the end of the carrier, and a tool so held extends in the direction of the axis of the carrier. Such a tool is clamped in place by means of a screw that is inserted in a socket, $c'$, the outer end of the latter being threaded for such purpose.

When the tool is held in the socket $c'$ in the carrier or rest, it projects through a slot, $a^3$, in the side of the body nearest the work, and is supported by the upper and lower walls of the slot, which forms a rest for the tool.

The inner end of the body, meaning by this the end nearest the head of the lathe when the tool is in use, is provided with means for setting the cutter at an angle with the axis of the lathe-spindle. This consists either in the beveled end, $a^4$, which is cut at a fixed angle, as sixty degrees or forty-five degrees, with the axis of the body, or which consists of the gage $g$, which has a plate or arm, $g'$, that is pivoted to the body so as to swing in a substantially horizontal plane in such manner that its face $g^2$ may be set at any desired angle with the axis of the feed spindle and carrier. This plate $g'$ is held in the desired position by means of a clamping bolt or nut, and which bears a graduated arc preferably on the curved edge of the plate, by means of which the angle at which the gage is set may be determined. This graduated arc is used in connection with an index-line on the body of the holder, and is not shown in the drawings, for the reason that it is of ordinary construction, and the method of using it will be readily understood.

The operation of the device is as follows: The slide-rest is held by means of its shank, that is grasped in a tool-post, $h$, of a lathe, and the tool held in the carrier is placed at any desired angle with the axis of the work. In case the tool is to be used in turning a taper—as, for instance, in forming the conical end of a lathe-center—the tool is set by placing the beveled end or the edge of the gage against the face-plate on the lathe-head, and the cutter is then moved back and forth across the work by means of the feed device of the slide-rest.

In an alternate form of my device the body $a'$ is pivoted to the shank by means of the bolt and nut $i$, and the rest can then be set at the desired angle without loosening the tool-post in the carriage.

My improved device furnishes a convenient and comparatively inexpensive tool that is readily applicable to any lathe, and by it a piece of work may be cut to any desired taper, either of outside or inner surface.

The body of the slide-rest may be formed without a shank, and may be clamped to a carriage on the lathe by any ordinary means.

I claim as my invention—

1. In a slide-rest, in combination, a body having a connected shank and a slot for the passage of a cutting-tool, a carrier having a tool-socket with means for clamping a tool in the socket, and the feed-spindle held against longitudinal movement in the body of the rest, all substantially as described.

2. In combination, a slide-rest, $a$, having a body $a'$, with slot $a^3$, and gage $g$, and bearing a sliding carrier, $c$, and a feed-spindle, $d$, whereby the carrier is reciprocated, all substantially as described.

3. As an improved article of manufacture, a slide-rest, $a$, having a body, $a'$, with a tool-slot, $a^3$, means for attaching the body to a carriage on the frame, a gage, $g$, a sliding carrier, $c$, with the transverse and longitudinal tool-sockets, and a feed-screw, $d$, all substantially as described.

JAMES FITZGERALD.

Witnesses:
GILMAN E. JOPP,
EDWARD B. BIGELOW.